(12) United States Patent
Oh et al.

(10) Patent No.: US 11,776,744 B2
(45) Date of Patent: Oct. 3, 2023

(54) MULTILAYER CERAMIC CAPACITOR AND MANUFACTURING METHOD THEREOF

(71) Applicant: SAMHWA CAPACITOR CO., LTD., Yongin-si (KR)

(72) Inventors: Young Joo Oh, Seoul (KR); Jung Rag Yoon, Goseong-gun (KR); Min Kee Kim, Yongin-si (KR); In Hee Cho, Anseong-si (KR)

(73) Assignee: SAMHWA CAPACITOR CO., LTD., Seoul (KR)

( * ) Notice: Subject to any disclaimer, the term of this patent is extended or adjusted under 35 U.S.C. 154(b) by 255 days.

(21) Appl. No.: 17/235,246

(22) Filed: Apr. 20, 2021

(65) Prior Publication Data

US 2021/0366653 A1    Nov. 25, 2021

(30) Foreign Application Priority Data

May 19, 2020 (KR) .................. 10-2020-0059740
Mar. 15, 2021 (KR) .................. 10-2021-0033315

(51) Int. Cl.
| | | |
|---|---|---|
| *H01G 4/012* | (2006.01) | |
| *H01G 4/008* | (2006.01) | |
| *H01G 4/12* | (2006.01) | |
| *C04B 35/468* | (2006.01) | |
| *H01G 4/30* | (2006.01) | |

(52) U.S. Cl.
CPC .......... *H01G 4/012* (2013.01); *C04B 35/468* (2013.01); *H01G 4/008* (2013.01); *H01G 4/1227* (2013.01); *H01G 4/30* (2013.01); *C04B 2235/66* (2013.01)

(58) Field of Classification Search
CPC ...... C04B 35/468; H01G 4/008; H01G 4/012; H01G 4/1227; H01G 4/30
See application file for complete search history.

(56) References Cited

U.S. PATENT DOCUMENTS

| | | | |
|---|---|---|---|
| 8,980,139 B2 | 3/2015 | Oh et al. | |
| 2005/0117274 A1* | 6/2005 | Miyauchi | H01G 4/12 361/321.2 |
| 2007/0074806 A1* | 4/2007 | Kojima | C04B 35/638 156/89.12 |
| 2013/0277622 A1* | 10/2013 | Oh | H01B 1/22 252/512 |
| 2013/0301185 A1* | 11/2013 | Lee | H01G 4/30 361/301.4 |
| 2013/0321977 A1* | 12/2013 | Lee | H01G 4/1227 361/301.4 |
| 2013/0321978 A1* | 12/2013 | Lee | H01G 4/1227 361/301.4 |

(Continued)

FOREIGN PATENT DOCUMENTS

| | | | |
|---|---|---|---|
| KR | 20060079897 A | * | 7/2006 |
| KR | 101883111 | | 8/2018 |
| KR | 20180115373 | | 10/2018 |

*Primary Examiner* — Nathan Milakovich
(74) *Attorney, Agent, or Firm* — CANTOR COLBURN LLP

(57) ABSTRACT

Provided is a multilayer ceramic capacitor having dielectric layers and internal electrode layers laminated alternately on one another. Each internal electrode layer comprises a common ceramic material containing 3 to 25% by weight of rare earth elements, and through the rare earth elements, high dielectric layers are formed on the interfaces between the dielectric layers and the internal electrode layers.

8 Claims, 1 Drawing Sheet

(56) References Cited

U.S. PATENT DOCUMENTS

| | | | | |
|---|---|---|---|---|
| 2014/0054514 A1* | 2/2014 | Kim | .................. | H02N 2/00 |
| | | | | 336/200 |
| 2015/0187497 A1* | 7/2015 | Saito | .................. | H01G 4/1227 |
| | | | | 361/301.4 |
| 2017/0025222 A1* | 1/2017 | Park | .................. | H01G 4/1209 |
| 2018/0290917 A1* | 10/2018 | Nishimura | .................. | H01G 4/228 |

* cited by examiner

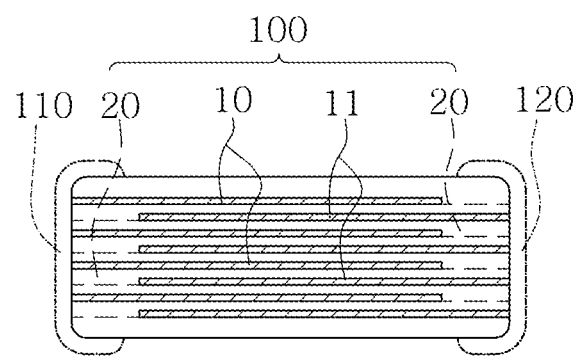

MULTILAYER CERAMIC CAPACITOR AND MANUFACTURING METHOD THEREOF

BACKGROUND OF THE INVENTION

1. Technical Field

The present invention relates to a multilayer ceramic capacitor and a manufacturing method thereof, and more particularly, to a multilayer ceramic capacitor and a manufacturing method thereof wherein rare earth elements consisting of lanthanum (La), samarium (Sm), and neodymium (Nd) are present in an amount of 3 to 25% by weight.

2. Description of the Related Art

A multilayer ceramic capacitor (MLCC) is an energy storage device in which dielectric layers made of a given ceramic material and electrode layers made of a metal material are alternately laminated on one another to greatly improve the capacitance thereof.

With the improvement of communication and electronics technologies, recently, multifunctional ultra-small electronic products have been developed, and accordingly, a demand for ultra-small and high-capacity multilayer ceramic capacitors has been increased.

So as to increase the capacitance of the multilayer ceramic capacitor, generally, the dielectric layers and the electrode layers become thin so that their thickness is reduced and the number of layers laminated is increased. In the process of allowing the dielectric layers and the electrode layers to become thin, however, the thicknesses of the internal electrode layers become irregular or partially broken, thereby increasing dielectric loss or decreasing the lifespan of a product.

So as to solve such problems, a method for controlling the mean grain sizes of dielectric layers in a multilayer ceramic electronic part is disclosed (in Korean Patent No. 10-1883111B1 issued on Aug. 24, 2018), and a method for adding a given metal oxide is disclosed (in Korean Patent Application Laid-open No. 10-2018-0115373 dated on Oct. 23, 2018). Through the above-mentioned conventional methods, however, it is very difficult to improve the capacitance of the multilayer ceramic capacitor.

SUMMARY OF THE INVENTION

Accordingly, the present invention has been made in view of the above-mentioned problems occurring in the related art, and it is an object of the present invention to provide a multilayer ceramic capacitor that is produced with a common ceramic material comprising 70 to 90% by weight of barium titanate ($BaTiO_3$) and 3 to 25% by weight of lanthanum oxide ($La_2O_3$), samarium oxide ($Sm_2O_3$), and neodymium oxide ($Nd_2O_3$).

It is another object of the present invention to provide a multilayer ceramic capacitor that is capable of adding 0.3 to 1.0% by weight of nickel oxide (NiO) to a common ceramic material, thereby improving the lifespan of a product.

To accomplish the above-mentioned objects, according to one aspect of the present invention, there is provided a multilayer ceramic capacitor having dielectric layers and internal electrode layers laminated alternately on one another, wherein each internal electrode layer 10, 11 may comprise a common ceramic material containing 3 to 25% by weight of rare earth elements, and through the rare earth elements, high dielectric layers are formed on the interfaces between the dielectric layers and the internal electrode layers.

According to the present invention, desirably, the grain sizes of the high dielectric layers and the thicknesses of the dielectric layers satisfy the following relation expression 1:

$$0.1 \leq D_c/t_d \leq 1 \quad \text{[Relation expression 1]}$$

(wherein $D_c$ represents the grain sizes of the high dielectric layers and $t_d$ represents the thicknesses of the dielectric layers).

According to the present invention, desirably, the grain size of the high dielectric layer and the thickness of the dielectric layer satisfy the following relation expression 2:

$$0.4 \leq D_c/t_d \leq 0.8 \quad \text{[Relation expression 2]}$$

(wherein $D_c$ represents the grain sizes of the high dielectric layers and $t_d$ represents the thicknesses of the dielectric layers).

According to the present invention, desirably, the grain sizes of the high dielectric layers are in the range of 200 to 400 nm.

According to the present invention, desirably, the thicknesses of the dielectric layers are in the range of 0.5 to 2 μm.

According to the present invention, desirably, the common ceramic material may comprise 70 to 90% by weight of barium titanate ($BaTiO_3$), 3 to 25% by weight of rare earth oxide ($Re_2O_3$) (Re are rare earth elements), and 0 to 5% by weight of nickel oxide (NiO), barium carbonate ($BaCO_3$), and silicon dioxide ($SiO_2$).

According to the present invention, desirably, the rare earth (Re) of the rare earth oxide ($Re_2O_3$) is one or more rare earth elements selected from the group consisting of lanthanum (La), samarium (Sm), and neodymium (Nd).

According to the present invention, desirably, the rare earth oxide ($Re_2O_3$) is lanthanum oxide ($La_2O_3$).

According to the present invention, desirably, the nickel oxide (NiO) is present in an amount of 0.3 to 1.0% by weight, based on the total weight of the common ceramic material.

According to the present invention, desirably, the common ceramic material may comprise 70 to 90% by weight of barium titanate ($BaTiO_3$) as a base material, 3 to 25% by weight of rare earth oxide ($Re_2O_3$)(Re are rare earth elements), 0.3 to 1.0% by weight of nickel oxide (NiO), 0 to 1.5% by weight of barium carbonate ($BaCO_3$), and 0 to 1.8% by weight of silicon dioxide ($SiO_2$).

According to the present invention, desirably, the dielectric layers and the internal electrode layers are alternately laminated on one another to thus form 300 to 1,000 layers.

To accomplish the above-mentioned objects, according to other aspect of the present invention, there is provided a method for manufacturing a multilayer ceramic capacitor, including the steps of: (a) forming a green sheet; (b) printing an electronic-forming paste on one surface of the green sheet; (c) laminating the green sheet on other green sheets to make a multilayer body; and (d) sintering the multilayer body to make dielectric layers, internal electrode layers, and high dielectric layers, wherein the electrode-forming paste may comprise a common ceramic material comprising 3 to 25% by weight of a rare earth element, and through the rare earth element, the permittivity of the high dielectric layers is increased.

According to the present invention, desirably, the grain sizes of the high dielectric layers and the thicknesses of the dielectric layers satisfy the following relation expression 2:

$$0.4 \leq D_c/t_d \leq 0.8 \quad \text{[Relation expression 2]}$$

(wherein $D_c$ represents the grain sizes of the high dielectric layers and $t_d$ represents the thicknesses of the dielectric layers).

According to the present invention, desirably, the rare earth element is lanthanum oxide ($La_2O_3$).

According to the present invention, desirably, the electrode-forming paste may further comprise metal powder comprising one selected from the group consisting of Nickel (Ni), Ni alloy, and copper (Cu).

According to the present invention, desirably, the metal powder has a mean grain size in a range of 80 to 200 nm.

BRIEF DESCRIPTION OF THE DRAWINGS

FIG. 1 is a view of multilayer ceramic capacitor according to one embodiment of the present application.

DETAILED DESCRIPTION

Hereinafter, a multilayer ceramic capacitor and a manufacturing method thereof according to the present invention will be described in detail, referring to FIG. 1. FIG. 1 shows a cross-sectional view of the multilayer ceramic capacitor according to an embodiment of the present invention. All terms used herein, including technical or scientific terms, unless otherwise defined, have the same meanings which are typically understood by those having ordinary skill in the art. If it is determined that the detailed explanation on the well known technology related to the present invention makes the scope of the present invention not clear, the explanation will be avoided for the brevity of the description.

The present invention relates to a multilayer ceramic capacitor, and more particularly, to a multilayer ceramic capacitor that is manufactured by adding rare earth elements having ionic radiuses of 108 pm to a common ceramic material constituting internal electrode layers 10, 11. Through the rare earth elements, high dielectric layers 20 are formed on the interfaces between the internal electrode layers 10, 11 and dielectric layers 20, thereby improving the electrical characteristics thereof.

According to the present invention, each internal electrode layer 10, 11 is an electrode layer laid on one surface of each dielectric layer 20 to improve the capacity of the multilayer ceramic capacitor, and in specific, the internal electrode layer 10, 11 is manufactured by applying electrode-forming paste to one surface of the dielectric layer 20 by means of screen printing and by then sintering the screen printed paste.

The electrode-forming paste is a material provided in the form of paste to form the internal electrode layers 10, 11, and in specific, the electrode-forming paste is made by mixing one or more materials selected from the group consisting of metal powder, a common ceramic material, an organic binder, a dispersing agent, and an organic solvent. In this case, the metal powder comprises one selected from the group consisting of Nickel (Ni), Ni alloy, and copper (Cu). According to the present invention, the metal powder represents Ni powder or alloy powder containing Ni, but it is not necessarily limited thereto.

According to the present invention, the common ceramic material represents an added material which serves to delay the sintered speed of the metal powder and to allow a contraction start temperature to be kept similar to that of a dielectric material. In the processes where the internal electrode layers 10, 11 are sintered, the common ceramic material is absorbed to the dielectric layers 20, or a portion thereof forms the interface layers between the dielectric layers 20 and the internal electrode layers 10, 11.

Further, the common ceramic material is made of the same material as the dielectric layers 20 or made of barium titanate ($BaTiO_3$) or barium zirconium titanate ($Ba(TiZr)O_3$) so as to minimize the reaction between the internal electrode layers 10, 11 and the dielectric layers 20. That is, the common ceramic material is made by adding yttrium oxide ($Y_2O_3$), manganese oxide ($Mn_3O_4$), and silicon oxide ($SiO_2$) to $BaTiO_3$ or $Ba(TiZr)O_3$ as a main component thereof.

According to an embodiment of the present invention, the common ceramic material may be made by adding rare earth oxides comprising one or more materials selected from the group consisting of yttrium (Y), dysprosium (Dy), holmium (Ho), ytterbium (Yb), and erbium (Er) to the main component of $BaTiO_3$. The rare earth elements can be replaced by a site A (a position of Ba) or a site B (a position of Ti) in $BaTiO_3$ having $ABO_3$ structure.

In specific, the crystallinity of $BaTiO_3$ upon the replacement of the site A or B may be varied according to the kinds of rare earth oxides replaced by the site A (the position of Ba) or the site B (the position of Ti) and the amounts of rare earth oxides added. For example, if $BaTiO_3$ having a tetragonal crystal structure is increased, permittivity is generally raised, so that even in the case where no grain growth is considered, the increasing effects of the permittivity in reaction layers can be provided.

As the rare earth oxides are combined with other additives, further, the grain growth behavior of $BaTiO_3$ can be varied.

Further, the rare earth oxides may be advantageously replaced by the site A or B, but they do not contribute to the grain growth of the interface layers. Actually, it is checked that the interface layers made by adding Y, Dy, Ho, Yb, and Er have the grain sizes less than 200 nm. Generally, if the grain sizes become fine, the permittivity becomes reduced by means of size effects.

If the rare earth elements having ionic radiuses less than 108 pm, that is, Y, Dy, Ho, Yb, and Er are added, accordingly, they do not contribute to the grain size growth of the interface layers, so that it is hard to improve the permittivity to a given level. Hereinafter, the ionic radiuses of the rare earth elements are suggested in the following Table 1.

TABLE 1

| | Element | | | | | | | |
|---|---|---|---|---|---|---|---|---|
| | Yb | Er | Y | Ho | Dy | Sm | Nd | La |
| Ionic radius(pm) | 100.8 | 103 | 104 | 104.1 | 105.2 | 109.8 | 112.3 | 117.2 |

According to the present invention, contrarily, the rare earth elements having large ionic radiuses may be added to the common ceramic material. In this case, it is hard that the rare earth elements are replaced by the site A or B of $BaTiO_3$, but they can contribute to the grain size growth of the interface layers.

In the sintering process, as a result, the rare earth elements are not replaced by the site A or B of $BaTiO_3$, but they may be precipitated from the interface layers between the dielectric layers 20 and the internal electrode layers 10, 11. Further, the rare earth elements precipitated may grow the grains of the interface layers. That is, the rare earth elements may induce abnormal grain growth to allow the grain sizes of the interface layers to be increased. The interface layers in which the grain sizes are increased to improve the permittivity can be defined as high dielectric layers 20. Accordingly, the high dielectric layers 20 having a thickness of 0.05 to 0.1 μm are formed on one surface of the interface layers.

According to the present invention, desirably, the grain sizes of the high dielectric layers 20 and the thicknesses of the dielectric layers 20 satisfy the following relation expression 1:

$$0.1 \leq D_c/t_d \leq 1.0 \qquad \text{[Relation expression 1]}$$

(wherein $D_c$ represents the grain sizes of the interface layers and $t_d$ represents the thicknesses of the dielectric layers).

If a ratio ($D_c/t_d$) of the grain sizes of the high dielectric layers 20 and the thicknesses of the dielectric layer 20 is less than 0.1, permittivity may be decreased by means of the size effects. Contrarily, if the ratio ($D_c/t_d$) of the grain sizes of the high dielectric layers 20 and the thicknesses of the dielectric layers 20 is greater than 1.0, temperature stability may be decreased to thus cause dielectric loss increase and reliability reduction.

More desirably, the grain sizes of the high dielectric layers 20 and the thicknesses of the dielectric layers 20 satisfy the following relation expression 2:

$$0.4 \leq D_c/t_d \leq 0.8 \qquad \text{[Relation expression 2]}$$

(wherein $D_c$ represents the grain sizes of the high dielectric layers and $t_d$ represents the thicknesses of the dielectric layers).

According to the present invention, the grain sizes of the high dielectric layers 20 may be desirably in the range of 200 to 400 nm, more desirably in the range of 250 to 370 nm, which satisfies the relation expressions 1 and 2.

According to the present invention, the thicknesses of the dielectric layers 20 are in the range of 0.5 to 2 μm. If the thicknesses of the dielectric layers 20 are less than 0.5 μm, the dielectric layers 20 lack durability, so that they may be easily broken in the sintering process or in use. This causes the insulation between the multilayer internal electrode layers 10, 11 to be weakened, thereby lowering the quality of a product. Contrarily, if the thicknesses of the dielectric layers 20 are greater than 2 μm, the number of the dielectric layers 20 and the internal electrode layers 10, 11 laminated on one another in the capacitor whose volume is limited is decreased, thereby reducing the capacity of the capacitor.

In specific, the capacity of the multilayer ceramic capacitor is determined upon the following relation expression 3:

$$C = \varepsilon_0 \cdot \varepsilon_r (n-1) A/t_d \qquad \text{[Relation expression 3]}$$

(wherein C represents the electrostatic capacity of the multilayer ceramic capacitor, $\varepsilon_0$ represents relative permittivity of air, Er represents relative permittivity of the dielectric layers 20, n represents the number of internal electrode layers 10, 11 laminated, $t_d$ represents the thicknesses of the dielectric layers 20, and A represents the areas of the internal electrode layers).

In specific, the thicknesses of the dielectric layers 20 are inversely proportional to the electrostatic capacity, and if the thicknesses of the dielectric layers 20 are increased, the number of internal electrode layers 10, 11 laminated is decreased. Accordingly, desirably, the thicknesses of the dielectric layers 20 are not greater than 2 μm.

According to the present invention, if the rare earth elements having the large ionic radiuses are coupled to the form of $Re_2O_3$, desirably, they are elements having ionic radiuses greater than 108 pm, and more desirably, they are one or more elements selected from the group consisting of La, Sm, and Nd.

Simultaneously, $BaTiO_3$ added is controlled in an amount of 70 to 90% by weight, and La, Sm, and Nd added is controlled in an amount of 3 to 25% by weight. If $BaTiO_3$ is added in an amount greater than 90% by weight, the amounts of rare earth elements added are reduced, thereby making it hard to expect the permittivity increasing effects. Contrarily, if $BaTiO_3$ is added in an amount less than 70% by weight, the dielectric loss may be increased, and further, the mean time to failure of the multilayer ceramic capacitor may be decreased to cause the quality of a product. Accordingly, desirably, $BaTiO_3$ is present in an amount of 70 to 90% by weight and La, Sm, and Nd are present in an amount of 3 to 25% by weight. More desirably, $BaTiO_3$ is present in an amount of 80 to 90% by weight and La, Sm, and Nd are present in an amount of 10 to 20% by weight.

According to the present invention, 0.3 to 1.0% by weight of nickel oxide (NiO) may be added to the common ceramic material so as to prevent delamination and cracks from occurring on the internal electrode layers 10, 11. Delamination is a phenomenon in which a portion of the internal electrode layer 10, 11 is separated. If NiO is not added or is present in an amount less than 0.3% by weight, the delamination and cracks occur on the internal electrode layers 10, 11, thereby decreasing the lifespan of the multilayer ceramic capacitor. If more than 1.0% by weight of NiO is added, further, the coupling between the internal electrode layers 10, 11 and the dielectric layers 20 become weakened, thereby causing the delamination. Accordingly, NiO added is present desirably in an amount of 0.3 to 1.0% by weight, more desirably in an amount of 0.5 to 1.0% by weight.

According to the present invention, the common ceramic material is present in an amount of 5 to 25% by weight with respect to the weight of the metal powder Ni. If the common ceramic material is present in an amount less than 5% by weight, the common ceramic material may lack the amount, thereby reducing the electrical characteristics of the multilayer ceramic capacitor. Contrarily, if the common ceramic material is present in an amount greater than 25% by weight, the common ceramic material may be lost in the sintering process, thereby decreasing the electrode connection after the sintering and reducing the electrical characteristics of the multilayer ceramic capacitor.

According to another embodiment of the present invention, there is provided a method for manufacturing a multilayer ceramic capacitor including the steps of (a) forming a green sheet, (b) printing an electronic-forming paste on one surface of the green sheet, (c) laminating the green sheet with other green sheets to make a multilayer body 100, and (d) sintering the multilayer body 100 to make dielectric layers 20, internal electrode layers 10, 11, and high dielectric layers 20. In this case, the electrode-forming paste comprises metal powder comprising one selected from the group consisting of Ni, Ni alloy, and Cu and a common ceramic material comprising 3 to 25% by weight of rare earth elements, and through the rare earth elements, the permittivity of the high dielectric layers 20 can be increased.

First, the step (a) forming the green sheet is carried out. In specific, a main component of $BaTiO_3$ is added to additives like yttrium oxide ($Y_2O_3$), manganese oxide ($Mn_3O_4$), silicon oxide ($SiO_2$), glass frit, and so on, thereby forming the green sheet. The method for forming the green sheet comprises one or more methods selected from the known technologies like doctor blade, lip casting, and so on.

According to the present invention, the green sheet is made desirably to the thickness of 0.3 to 3 μm, more desirably to the thickness of 0.5 to 2.0 μm.

In the step (b), the electronic-forming paste is printed on one surface of the green sheet. As mentioned above, the electronic-forming paste is made by mixing one or more materials selected from the metal powder, the common ceramic material, an organic binder, a dispersing agent, and an organic solvent.

According to the present invention, the organic binder comprises one or more materials selected from the group consisting of ethyl cellulose, polyvinyl butyral (PVB), and polyvinyl pyrrolidone (PVP), and otherwise, another organic binder, which is typically used, can be used.

According to the present invention, the organic solvent comprises one or more materials selected from the group consisting of terpineol, a-terpineol, dethydro-terpineol, and dethydro-terpineol-acetate, and otherwise, another organic solvent, which is typically used, can be used.

According to the present invention, the dispersing agent comprises one or more materials selected from the group consisting of glycerol-alpha-monooleate and nonylphenol ethoxylate phosphate ester, and otherwise, another dispersing agent, which is typically used, can be used.

In the step (c), the green sheet is laminated on other green sheets to make the multilayer body 100.

According to the present invention, 300 to 1,000 green sheets are laminated on one another, thereby making the multilayer body 100. If the number of green sheets laminated on one another is less than 300, in specific, the electrostatic capacity of the multilayer ceramic capacitor can be reduced through the above-mentioned relation expression 3, which is suggested again below.

$$C = \varepsilon_0 \cdot \varepsilon_r (n-1) A / t_d$$ [Relation expression 3]

(wherein C represents the electrostatic capacity of the multilayer ceramic capacitor, $\varepsilon_0$ represents relative permittivity of air, Er represents relative permittivity of the dielectric layers 20, n represents the number of internal electrode layers 10, 11 laminated, $t_d$ represents the thicknesses of the dielectric layers 20, and A represents the areas of the internal electrode layers 10, 11).

Contrarily, if the number of green sheets laminated on one another is greater than 1,000, the green sheets are excessively thin in thickness so that they may be broken during the sintering process and their insulation may be deteriorated. Accordingly, the multilayer body 100 is made desirably through the lamination of 300 to 1,000 green sheets, more desirably through the lamination of 350 to 500 green sheets.

In the step (d), the multilayer body 100 is subjected to sintering to make the dielectric layers 20, the internal electrode layers 10, 11, and the high dielectric layers 20. Before the sintering, in specific, the multilayer body 100 is subjected to primary plasticization to a temperature of 200 to 350° C. in the air or in inert gas atmosphere and to secondary plasticization to a temperature of 800 to 900° C. in the inert gas atmosphere. The primary plasticization is carried out for 30 to 50 hours, and the second plasticization for three to eight hours. After that, the multilayer body 100 is raised up to a temperature of 80° C./min in a given reducing atmosphere and is then sintered at a temperature of 1,100 to 1,200° C. for 0.5 to two hours.

According to the present invention, the multilayer body 100 whose sintering is finished is subjected to oxidization to a temperature of 900 to 1,100° C. in the atmosphere of 02 of 20 to 40 ppm.

Hereinafter, the multilayer ceramic capacitor and the method for manufacturing the same according to the present invention will be in detail explained with reference to examples. However, it is to be understood that the disclosed examples are merely exemplary of the invention, which can be embodied in various forms.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. Further, the additives, which are not specially described in the present invention, may have a unit of atom %.

1) Manufacturing Common Ceramic Material

Manufacturing Example

First, $BaTiO_3$ having the grain size of 25 nm as the main component and given additives were prepared. The additives may comprise one or more materials selected from the group consisting of barium carbonate ($BaCO_3$), dyspronsium oxide ($Dy_2O_3$), yttrium oxide ($Y_2O_3$), silicon oxide ($SiO_2$), and nickel oxide (NiO). Specific ratios of $BaTiO_3$ and the given additives are suggested in the following Tables 2 and 3.

After $BaTiO_3$ and the given additives were put in a reaction container, they were subjected to hydrothermal synthesis at a temperature of 180° C. for three hours. Next, rare earth oxides ($Re_2O_3$) consisting of samarium oxide ($Sm_2O_3$), neodymium oxide ($Nd_2O_3$), and lanthanum oxide ($La_2O_3$), which had the size of 60 nm, were mixed to make a common ceramic mixture. Lastly, the common ceramic mixture and zirconia balls with a diameter of 0.3 mm were added to ethanol and were then dispersed for 12 hours, thereby making a common ceramic mixture liquid.

TABLE 2

| | Contents in common ceramic material (wt %) | | | | | | | |
|---|---|---|---|---|---|---|---|---|
| | $BaTiO_3$ | $BaCO_3$ | $Dy_2O_3$ | $Y_2O_3$ | $SiO_2$ | $La_2O_3$ | $Nd_2O_3$ | $Sm_2O_3$ | NiO |
| Manufacturing example 1 | 90 | 0.0 | 0.0 | 0.0 | 0.0 | 9.5 | 0.0 | 0.0 | 0.5 |
| Manufacturing example 2 | 80 | 1.0 | 0.0 | 0.0 | 0.0 | 15.0 | 0.0 | 3.5 | 0.5 |
| Manufacturing example 3 | 75 | 0.5 | 0.5 | 0.5 | 0.5 | 10.0 | 10.0 | 2.5 | 0.5 |
| Manufacturing example 4 | 90 | 0.5 | 0.5 | 0.5 | 0.5 | 5.0 | 0.0 | 2.0 | 1.0 |
| Manufacturing example 5 | 90 | 0.5 | 0.5 | 0.5 | 0.5 | 5.0 | 2.5 | 0.0 | 0.5 |
| Manufacturing example 6 | 80 | 0.5 | 0.5 | 0.5 | 0.5 | 3.0 | 3.0 | 11.5 | 0.5 |

TABLE 2-continued

| | Contents in common ceramic material (wt %) | | | | | | | | |
|---|---|---|---|---|---|---|---|---|---|
| | $BaTiO_3$ | $BaCO_3$ | $Dy_2O_3$ | $Y_2O_3$ | $SiO_2$ | $La_2O_3$ | $Nd_2O_3$ | $Sm_2O_3$ | NiO |
| Manufacturing example 7 | 75 | 0.0 | 0.5 | 0.5 | 0.0 | 10.0 | 3.0 | 10.7 | 0.3 |
| Manufacturing example 8 | 90 | 0.0 | 0.5 | 0.5 | 0.0 | 0.0 | 8.7 | 0.0 | 0.3 |
| Manufacturing example 9 | 80 | 1.5 | 0.0 | 1.0 | 1.0 | 3.0 | 1.0 | 12.2 | 0.3 |
| Manufacturing example 10 | 90 | 1.5 | 0.0 | 1.0 | 1.0 | 5.0 | 1.0 | 0.0 | 0.5 |
| Manufacturing example 11 | 85 | 1.5 | 0.0 | 1.0 | 1.0 | 0.0 | 1.0 | 10.0 | 0.5 |
| Manufacturing example 12 | 80 | 0.0 | 0.0 | 1.0 | 1.0 | 5.0 | 1.0 | 11.0 | 1.0 |
| Manufacturing example 13 | 90 | 0.0 | 1.0 | 0.0 | 1.0 | 5.0 | 1.0 | 1.5 | 0.5 |
| Manufacturing example 14 | 80 | 0.0 | 1.0 | 0.0 | 1.0 | 5.0 | 3.0 | 9.5 | 0.5 |
| Manufacturing example 15 | 90 | 0.0 | 1.0 | 0.5 | 1.0 | 5.0 | 0.0 | 2.2 | 0.3 |
| Manufacturing example 16 | 90 | 0.0 | 1.0 | 0.5 | 1.0 | 0.0 | 5.0 | 2.2 | 0.3 |
| Manufacturing example 17 | 80 | 0.5 | 1.0 | 0.5 | 1.0 | 3.0 | 10.0 | 3.5 | 0.5 |
| Manufacturing example 18 | 90 | 0.0 | 0.0 | 0.5 | 0.0 | 0.0 | 5.0 | 4.0 | 0.5 |
| Manufacturing example 19 | 85 | 0.5 | 0.0 | 0.5 | 0.0 | 5.0 | 0.0 | 8.5 | 0.5 |
| Manufacturing example 20 | 70 | 1.0 | 0.0 | 3.0 | 1.0 | 3.0 | 3.0 | 18.5 | 0.5 |

TABLE 3

| | Contents in common ceramic material (wt %) | | | | | | | | |
|---|---|---|---|---|---|---|---|---|---|
| | $BaTiO_3$ | $BaCO_3$ | $Dy_2O_3$ | $Y_2O_3$ | $SiO_2$ | $La_2O_3$ | $Nd_2O_3$ | $Sm_2O_3$ | NiO |
| Manufacturing example 21 | 90 | 1.5 | 1.0 | 0.0 | 1.0 | 0.5 | 3.0 | 2.5 | 0.5 |
| Manufacturing example 22 | 85 | 0.5 | 3.0 | 3.0 | 1.0 | 1.0 | 5.0 | 1.0 | 0.5 |
| Manufacturing example 23 | 80 | 0.5 | 3.0 | 1.0 | 0.0 | 0.0 | 0.0 | 15.0 | 0.5 |
| Manufacturing example 24 | 80 | 1.0 | 0.0 | 1.0 | 0.0 | 5.0 | 0.0 | 12.5 | 0.5 |
| Manufacturing example 25 | 70 | 1.0 | 5.0 | 1.0 | 0.0 | 0.0 | 5.0 | 17.0 | 1.0 |
| Manufacturing example 26 | 90 | 1.0 | 0.5 | 0.0 | 0.0 | 5.0 | 3.0 | 0.0 | 0.5 |
| Manufacturing example 27 | 85 | 1.0 | 0.5 | 0.5 | 0.0 | 0.5 | 3.0 | 9.0 | 0.5 |
| Manufacturing example 28 | 80 | 1.0 | 0.5 | 0.5 | 0.0 | 0.5 | 10.0 | 7.0 | 0.5 |
| Manufacturing example 29 | 90 | 1.0 | 1.0 | 1.0 | 0.0 | 1.0 | 5.0 | 0.0 | 1.0 |
| Manufacturing example 30 | 90 | 1.0 | 0.0 | 0.0 | 0.0 | 1.0 | 3.0 | 4.0 | 1.0 |
| Manufacturing example 31 | 80 | 1.0 | 0.0 | 0.0 | 0.0 | 3.0 | 10.0 | 5.0 | 1.0 |
| Comparative manufacturing example 1 | 97 | 1.0 | 1.0 | 1.0 | 0.0 | 0.0 | 0.0 | 0.0 | 0.0 |
| Comparative manufacturing example 2 | 97 | 0.3 | 0.3 | 2.4 | 0.0 | 0.0 | 0.0 | 0.0 | 0.0 |
| Comparative manufacturing example 3 | 97 | 1.6 | 0.0 | 1.4 | 0.0 | 0.0 | 0.0 | 0.0 | 0.0 |
| Comparative manufacturing example 4 | 97 | 1.0 | 0.0 | 2.0 | 0.0 | 0.0 | 0.0 | 0.0 | 0.0 |
| Comparative manufacturing example 5 | 90 | 2.0 | 3.0 | 1.0 | 1.0 | 0.0 | 1.0 | 1.5 | 0.5 |

TABLE 3-continued

| | Contents in common ceramic material (wt %) | | | | | | | | |
|---|---|---|---|---|---|---|---|---|---|
| | $BaTiO_3$ | $BaCO_3$ | $Dy_2O_3$ | $Y_2O_3$ | $SiO_2$ | $La_2O_3$ | $Nd_2O_3$ | $Sm_2O_3$ | NiO |
| Comparative manufacturing example 6 | 65 | 1.5 | 3.0 | 1.0 | 1.0 | 0.0 | 24.5 | 3.0 | 1.0 |
| Comparative manufacturing example 7 | 65 | 0.5 | 0.0 | 1.0 | 1.0 | 3.0 | 5.0 | 23.5 | 1.0 |
| Comparative manufacturing example 8 | 70 | 1.5 | 0.0 | 1.0 | 1.0 | 3.0 | 1.0 | 22.2 | 0.3 |
| Comparative manufacturing example 9 | 70 | 1.0 | 1.0 | 1.0 | 0.0 | 1.0 | 0.0 | 25.0 | 1.0 |
| Comparative manufacturing example 10 | 70 | 0.5 | 1.0 | 0.5 | 1.0 | 5.0 | 10.0 | 11.5 | 0.5 |
| Comparative manufacturing example 11 | 70 | 0.0 | 1.0 | 0.0 | 1.0 | 10.0 | 10.0 | 8.0 | 0.0 |
| Comparative manufacturing example 12 | 90 | 0.5 | 0.0 | 1.0 | 1.0 | 5.0 | 1.0 | 1.5 | 0.0 |
| Comparative manufacturing example 13 | 80 | 0.5 | 10.0 | 0.0 | 0.0 | 0.5 | 5.0 | 4.0 | 0.0 |
| Comparative manufacturing example 14 | 90 | 0.0 | 0.0 | 0.0 | 0.0 | 5.0 | 1.0 | 2.5 | 1.5 |

2) Manufacturing Internal Electrode Paste

The common ceramic materials manufactured by the manufacturing examples 1 to 31 and the comparative manufacturing examples 1 to 14 were mixed with metal powder, a binder, a dispersing agent, and an organic solvent, thereby manufacturing internal electrode pastes. The metal powder was Ni with a mean grain size of 0.2 μm, and the binder was ethyl cellulose resin having a molecular weight of about 200,000. The dispersing agent was glycerol-alpha-monooleate, $CH(CH_2)_7COOCH_2CCH_2OHH$, and the organic solvent was terpineol.

In specific, the metal powder, the common ceramic material, the binder, the dispersing agent, and the organic solvent were mixed to the rates as suggested in the following Tables 4 and 5, and next, sodium cocoyl glutamic acid as a settling agent was added to the mixture and was dispersed at viscosity of about 80,000 by means of a three roll mill, thereby manufacturing the internal electrode pastes.

TABLE 4

| | Applied common ceramic material | Ni metal powder (wt %) | Common ceramic material (wt %) | Organic solvent (wt %) | Dispersing agent (wt %) |
|---|---|---|---|---|---|
| Example 1 | Manufacturing example 1 | 45 | 15 | 39 | 1 |
| Example 2 | Manufacturing example 2 | 45 | 15 | 39.1 | 0.9 |
| Example 3 | Manufacturing example 3 | 51 | 11 | 37 | 1 |
| Example 4 | Manufacturing example 4 | 47 | 15 | 37 | 1 |
| Example 5 | Manufacturing example 5 | 49 | 11 | 39.2 | 0.8 |
| Example 6 | Manufacturing example 6 | 43 | 7 | 48.9 | 1.1 |
| Example 7 | Manufacturing example 7 | 51 | 7 | 40.9 | 1.1 |
| Example 8 | Manufacturing example 8 | 43 | 15 | 41.1 | 0.9 |
| Example 9 | Manufacturing example 9 | 49 | 11 | 39 | 1 |
| Example 10 | Manufacturing example 10 | 43 | 11 | 45.1 | 0.9 |
| Example 11 | Manufacturing example 11 | 47 | 11 | 41 | 1 |
| Example 12 | Manufacturing example 12 | 47 | 7 | 44.9 | 1.1 |
| Example 13 | Manufacturing example 13 | 43 | 7 | 49 | 1 |
| Example 14 | Manufacturing example 14 | 45 | 7 | 47.2 | 0.8 |
| Example 15 | Manufacturing example 15 | 51 | 15 | 33 | 1 |
| Example 16 | Manufacturing example 16 | 51 | 15 | 32.9 | 1.1 |
| Example 17 | Manufacturing example 17 | 49 | 15 | 34.9 | 1.1 |
| Example 18 | Manufacturing example 18 | 43 | 11 | 45 | 1 |
| Example 19 | Manufacturing example 19 | 49 | 11 | 39 | 1 |
| Example 20 | Manufacturing example 20 | 49 | 15 | 35.1 | 0.9 |

TABLE 5

| | Applied common ceramic material | Ni metal powder (wt %) | Common ceramic material (wt %) | Organic solvent (wt %) | Dispersing agent (wt %) |
|---|---|---|---|---|---|
| Example 21 | Manufacturing example 21 | 49 | 7 | 43 | 1 |
| Example 22 | Manufacturing example 22 | 47 | 7 | 45 | 1 |

TABLE 5-continued

| | Applied common ceramic material | Ni metal powder (wt %) | Common ceramic material (wt %) | Organic solvent (wt %) | Dispersing agent (wt %) |
|---|---|---|---|---|---|
| Example 23 | Manufacturing example 23 | 51 | 11 | 37.1 | 0.9 |
| Example 24 | Manufacturing example 24 | 47 | 11 | 41 | 1 |
| Example 25 | Manufacturing example 25 | 51 | 15 | 32.9 | 1.1 |
| Example 26 | Manufacturing example 26 | 51 | 7 | 41 | 1 |
| Example 27 | Manufacturing example 27 | 43 | 15 | 40.9 | 1.1 |
| Example 28 | Manufacturing example 28 | 47 | 7 | 45.1 | 0.9 |
| Example 29 | Manufacturing example 39 | 45 | 7 | 47.2 | 0.8 |
| Example 30 | Manufacturing example 30 | 47 | 11 | 41 | 1 |
| Example 31 | Manufacturing example 31 | 45 | 15 | 39 | 1 |
| Comparative example 1 | Comparative manufacturing example 1 | 45 | 15 | 39 | 1 |
| Comparative example 2 | Comparative manufacturing example 2 | 47 | 11 | 40.9 | 1.1 |
| Comparative example 3 | Comparative manufacturing example 3 | 49 | 15 | 35.2 | 0.8 |
| Comparative example 4 | Comparative manufacturing example 4 | 51 | 7 | 41 | 1 |
| Comparative example 5 | Comparative manufacturing example 5 | 45 | 7 | 47 | 1 |
| Comparative example 6 | Comparative Manufacturing example 6 | 49 | 15 | 34.9 | 1.1 |
| Comparative example 7 | Comparative manufacturing example 7 | 45 | 11 | 42.9 | 1.1 |
| Comparative example 8 | Comparative manufacturing example 8 | 43 | 11 | 45.1 | 0.9 |
| Comparative example 9 | Comparative manufacturing example 9 | 51 | 7 | 41.2 | 0.8 |
| Comparative example 10 | Comparative manufacturing example 10 | 45 | 7 | 47 | 1 |
| Comparative example 11 | Comparative manufacturing example 11 | 47 | 11 | 41 | 1 |
| Comparative example 12 | Comparative manufacturing example 12 | 43 | 15 | 40.9 | 1.1 |
| Comparative example 13 | Comparative manufacturing example 13 | 49 | 7 | 42.8 | 1.2 |

3) Manufacturing Multilayer Ceramic Capacitor $BaTiO_3$ as a main component was added to additives like yttrium oxide ($Y_2O_3$), manganese oxide ($Mn_3O_4$), silicon oxide ($SiO_2$), glass frit, and so on, thereby forming green sheets having a thickness of 0.9 μm.

The internal electrode pastes manufactured by the manufacturing examples 1 to 31 and the comparative manufacturing examples 1 to 14 were applied to one surface of the green sheets by means of screen printing, and 380 green sheets on which the internal electrode pastes were printed were laminated on one another. After that, the green sheets laminated were compressed at a pressure of 1,000 kgf/cm², thereby manufacturing the multilayer bodies.

Next, each multilayer body 100 was subjected to primary plasticization to a temperature of 250° C. in the air for 45 hours and to secondary plasticization to a temperature of 850° C. in the inert gas atmosphere for four hours. After that, the multilayer body 100 subjected to the primary and secondary plasticization was raised up to a temperature of 80° C./min in a given reducing atmosphere and was then sintered at a temperature of 1,200° C. for two hours.

After that, the multilayer body 100 whose sintering was finished was subjected to oxidization to a temperature of 1,000° C. in the atmosphere of 02 of 35 ppm.

Lastly, the multilayer body 100 whose oxidization was finished was subjected to grinding to expose both ends of the internal electrode layers 10, 11, and next, both ends exposed were coated with Cu and were subjected to heat treatment at a temperature of 700° C., thereby forming an external electrode 110, 120 connected to the internal electrode layers 10, 11, so that the multilayer ceramic capacitor having a size of 1.0×0.5 mm² and a thickness of 0.5 mm was manufactured.

[Method for Estimating Characteristics]

1) Capacitance (μF) and Dielectric Loss (%)

The capacitance and dielectric loss were measured by means of a capacitance meter (3504-50C HiTester made by HIOKI corporation) used in the market, and the capacitance was measured at a frequency of 1 kHz, a voltage of 0.5 Vrms, and a temperature of 25° C.

2) Insulation Resistance (MΩ)

After a direct current voltage of 10 to 50 V at a temperature of 25° C. was applied for 60 seconds, the insulation resistance was measured by means of a high resistance meter 4329A made by HP corporation.

3) Mean Time to Failure (MTTF)

The mean time to failure was calculated through the following relation expression 4:

$$L_s = L_r (V_s/V_r)^3 \cdot e^{(tr-ts)/10.0} \quad \text{[Relation expression 4]}$$

(wherein Vs represents a really applied voltage, Ts a real temperature, Vr a rated voltage, tr an allowable temperature, $L_s$ mean time to failure under the really applied voltage Vs and the real temperature ts, $L_r$ mean time to failure under the rated voltage Vr and the allowable temperature tr).

4) Delamination Occurrence

The delamination occurrence was checked through an optical microscope. (B×53M made by OLYMPUS corporation)

The estimation results of the characteristics of the multilayer ceramic capacitors are suggested in the following Tables 6 and 7.

TABLE 6

| | Applied common ceramic material | Electrical characteristics | | | Lifespan characteristics | |
|---|---|---|---|---|---|---|
| | | capacitance (μF) | Dielectric loss (%) | Insulation resistance (MΩ) | Mean time to failure (year) | Delamination occurrence |
| Example 1 | Manufacturing example 1 | 10.5 | 5.25 | 211.0 | 17.2 | X |
| Example 2 | Manufacturing example 2 | 11.3 | 6.23 | 120.0 | 15.0 | X |
| Example 3 | Manufacturing example 3 | 11.4 | 6.40 | 135.0 | 14.7 | X |
| Example 4 | Manufacturing example 4 | 10.3 | 5.01 | 302.6 | 17.9 | X |
| Example 5 | Manufacturing example 5 | 11.1 | 5.93 | 346.9 | 15.6 | X |
| Example 6 | Manufacturing example 6 | 10.6 | 5.35 | 319.0 | 17.0 | X |
| Example 7 | Manufacturing example 7 | 12.3 | 7.70 | 430.2 | 12.6 | X |
| Example 8 | Manufacturing example 8 | 11.2 | 6.19 | 359.3 | 15.1 | X |
| Example 9 | Manufacturing example 9 | 11.5 | 6.51 | 374.0 | 14.5 | X |
| Example 10 | Manufacturing example 10 | 9.5 | 4.04 | 255.3 | 21.2 | X |
| Example 11 | Manufacturing example 11 | 10.1 | 4.71 | 288.1 | 18.8 | X |
| Example 12 | Manufacturing example 12 | 10.6 | 5.38 | 320.2 | 16.9 | X |
| Example 13 | Manufacturing example 13 | 9.0 | 3.48 | 227.7 | 23.8 | X |
| Example 14 | Manufacturing example 14 | 11.1 | 5.93 | 346.7 | 15.6 | X |
| Example 15 | Manufacturing example 15 | 10.6 | 5.29 | 316.1 | 17.2 | ○ |
| Example 16 | Manufacturing example 16 | 11.8 | 6.92 | 393.4 | 13.8 | X |
| Example 17 | Manufacturing example 17 | 10.2 | 4.84 | 294.3 | 18.4 | X |
| Example 18 | Manufacturing example 18 | 9.9 | 4.45 | 275.3 | 19.7 | X |
| Example 19 | Manufacturing example 19 | 11.0 | 5.91 | 345.5 | 15.7 | X |
| Example 20 | Manufacturing example 20 | 10.6 | 5.34 | 318.4 | 17.0 | X |

TABLE 7

| | Applied common ceramic material | Electrical characteristics | | | Lifespan characteristics | |
|---|---|---|---|---|---|---|
| | | capacitance (μF) | Dielectric loss (%) | Insulation resistance (MΩ) | Mean time to failure (year) | Delamination occurrence |
| Example 21 | Manufacturing example 21 | 11.6 | 6.68 | 382.0 | 14.2 | X |
| Example 22 | Manufacturing example 22 | 12.7 | 8.35 | 460.3 | 11.8 | X |
| Example 23 | Manufacturing example 24 | 11.3 | 6.30 | 364.4 | 14.9 | X |
| Example 24 | Manufacturing example 26 | 12.3 | 7.70 | 430.3 | 12.6 | X |
| Example 25 | Manufacturing example 27 | 10.1 | 4.72 | 288.5 | 18.8 | X |
| Example 26 | Manufacturing example 28 | 10.5 | 5.21 | 312.4 | 17.3 | X |
| Example 27 | Manufacturing example 29 | 10.7 | 5.45 | 323.6 | 16.8 | X |
| Example 28 | Manufacturing example 30 | 10.8 | 5.54 | 328.1 | 16.5 | X |
| Example 29 | Manufacturing example 31 | 10.5 | 5.21 | 312.1 | 17.4 | X |
| Example 30 | Manufacturing example 32 | 10.7 | 5.47 | 324.6 | 16.7 | X |

TABLE 7-continued

|  | Applied common ceramic material | Electrical characteristics | | | Lifespan characteristics | |
|---|---|---|---|---|---|---|
|  |  | capacitance (μF) | Dielectric loss (%) | Insulation resistance (MΩ) | Mean time to failure (year) | Delamination occurrence |
| Comparative example 1 | Comparative manufacturing example 1 | 7.7 | 2.27 | 434.0 | 32.6 | ○ |
| Comparative example 2 | Comparative manufacturing example 2 | 7.9 | 2.41 | 721.0 | 31.3 | ○ |
| Comparative example 3 | Comparative manufacturing example 3 | 8.1 | 2.63 | 569.0 | 29.4 | ○ |
| Comparative example 4 | Comparative manufacturing example 4 | 8.5 | 2.96 | 436.0 | 26.9 | X |
| Comparative example 5 | Comparative manufacturing example 5 | 9.6 | 4.13 | 259.9 | 20.9 | X |
| Comparative example 6 | Comparative manufacturing example 6 | 9.1 | 12.10 | 112.0 | 0.6 | X |
| Comparative example 7 | Comparative manufacturing example 7 | 25.0 | 16.20 | 31.0 | 0.5 | X |
| Comparative example 8 | Comparative manufacturing example 8 | 12.4 | 7.95 | 150.0 | 0.5 | X |
| Comparative example 9 | Comparative manufacturing example 9 | 11.9 | 15.70 | 120.0 | 1.2 | X |
| Comparative example 10 | Comparative manufacturing example 10 | 11.8 | 6.92 | 393.4 | 13.8 | X |
| Comparative example 11 | Comparative manufacturing example 11 | 15.3 | 28.00 | 18.0 | 0.1 | ○ |
| Comparative example 12 | Comparative manufacturing example 12 | 10.0 | 4.63 | 120.0 | 3.1 | ○ |
| Comparative example 13 | Comparative manufacturing example 13 | 11.4 | 8.10 | 369.4 | 5.9 | ○ |
| Comparative example 14 | Comparative manufacturing example 14 | 9.6 | 4.12 | 160.1 | 5.6 | ○ |

As appreciated from Tables 6 and 7, it is understood that the multilayer ceramic capacitors comprising 3 to 25% by weight of the rare earth oxides ($Re_2O_3$) consisting of samarium oxide ($Sm_2O_3$), neodymium oxide ($Nd_2O_3$), and lanthanum oxide ($La_2O_3$) have the capacitance of average 11 g and the dielectric loss of 6.1%. Further, the multilayer ceramic capacitors have the insulation resistance of 309.7 MΩ and the mean time to failure of 160.6 h.

Contrarily, the comparative examples 1 to 4 comprising no rare earth oxides ($Re_2O_3$) and the comparative example 5 comprising 2.5% by weight of the rare earth oxides ($Re_2O_3$) have the capacitance of average 8.4 g, the dielectric loss of 2.9%, the insulation resistance of 484.0 MΩ, and the mean time to failure of 281.9 h. That is, it is checked that when the rare earth oxides ($Re_2O_3$) in the common ceramic material are present in an amount of 3 to 25% by weight, the capacitance is increased by 1.3 times, and the insulation resistance is increased by 1.7 times.

Further, the comparative examples 6 to 11 comprising more than 2.5% by weight of the rare earth oxides ($Re_2O_3$) have the capacitance and insulation resistance increased to the similar levels to those in examples 1 to 32. However, the dielectric loss is increased by 2.3 times, and the mean time to failure is decreased by 17%. Accordingly, it is checked that the rare earth oxides ($Re_2O_3$) in the common ceramic material have to be present desirably in an amount of 3 to 25% by weight, more desirably, in an amount of 10 to 20% by weight.

Referring to the comparative examples 11 to 13, further, it is checked that if NiO is present in an amount less than 0.3% by weight, the mean time to failure is less than 100 h. This is because the lifespan of the multilayer ceramic capacitor is reduced due to the occurrence of the delamination on the reaction layer. In addition, it is checked that even in the case of the comparative example 14 comprising more than 1.0% by weight of NiO, the delamination occurs. This is because spaces are formed due to the weakened coupling between the internal electrode layers 10, 11 and the dielectric layers 20 when a large amount of NiO is added.

That is, the multilayer ceramic capacitor according to the present invention is manufactured with the common ceramic material that comprises 3 to 25% by weight of La, Nd, and Sm and 0.3 to 1.0% by weight of NiO, thereby improving the capacitance and the insulation resistance thereof. Further, the dielectric loss is reduced to less than 8%, and the mean time to failure is maintained to more than 200 h. Accordingly, the multilayer ceramic capacitor according to the present invention can have the electrical characteristics and the lifespan characteristics more improved than the existing capacitors.

As described above, the multilayer ceramic capacitor according to the present invention is produced with the common ceramic material that comprises 70 to 90% by weight of $BaTiO_3$ and 3 to 25% by weight of $La_2O_3$, $Sm_2O_3$, and $Nd_2O_3$, thereby greatly improving the capacitance and insulation resistance thereof and maintaining the dielectric loss and the mean time to failure to the same levels as in the existing capacitors.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The scope of the present invention does not limit the invention within specific embodiments, and it should be understood that the invention covers all the modifications, equivalents, and replacements within the idea and technical scope of the invention.

What is claimed is:

1. A multilayer ceramic capacitor having dielectric layers and internal electrode layers laminated alternately on one another, wherein each internal electrode layer comprises a common ceramic material containing 3 to 25% by weight of rare earth oxide, and through the rare earth oxide, high dielectric layers are formed on interfaces between the dielectric layers and the internal electrode layers, wherein the common ceramic material further comprises 70 to 90% by weight of barium titanate ($BaTiO_3$) as a base material, 0.3 to 1.0% by weight of nickel oxide (NiO), 0 to 1.5% by weight of barium carbonate ($BaCO_3$), and 0 to 1.8% by weight of silicon dioxide ($SiO_2$).

2. The multilayer ceramic capacitor according to claim 1, wherein grain sizes of the high dielectric layers and thicknesses of the dielectric layers satisfy the following relation expression 1:

$$0.1 \leq D_c/t_d \leq 1 \qquad \text{[Relation expression 1]}$$

(wherein $D_c$ represents the grain sizes of the high dielectric layers and $t_d$ represents the thicknesses of the dielectric layers).

3. The multilayer ceramic capacitor according to claim 1, wherein grain sizes of the high dielectric layers and thicknesses of the dielectric layers satisfy the following relation expression 2:

$$0.4 \leq D_c/t_d \leq 0.8 \qquad \text{[Relation expression 2]}$$

(wherein $D_c$ represents the grain sizes of the high dielectric layers and $t_d$ represents the thicknesses of the dielectric layers).

4. The multilayer ceramic capacitor according to claim 1, wherein grain sizes of the high dielectric layers are in a range of 200 to 400 nm.

5. The multilayer ceramic capacitor according to claim 1, wherein thicknesses of the dielectric layers are in a range of 0.5 to 2 μm.

6. The multilayer ceramic capacitor according to claim 1, wherein the rare earth oxide comprises one or more rare earth elements selected from the group consisting of lanthanum (La), samarium (Sm), and neodymium (Nd).

7. The multilayer ceramic capacitor according to claim 1, wherein the rare earth oxide is lanthanum oxide ($La_2O_3$).

8. The multilayer ceramic capacitor according to claim 1, wherein the dielectric layers and the internal electrode layers are alternately laminated on one another to form 300 to 1,000 layers.

* * * * *